Sept. 8, 1964  G. E. FORD  3,147,672
APPARATUS FOR MAKING BOTTLE CAPS AND THE LIKE
Filed Sept. 27, 1961  9 Sheets-Sheet 1

Fig.1

Inventor
G. E. Ford
By
Holcombe, Wetherill & Brisebois
Attorneys

Sept. 8, 1964    G. E. FORD    3,147,672
APPARATUS FOR MAKING BOTTLE CAPS AND THE LIKE
Filed Sept. 27, 1961    9 Sheets-Sheet 2

Inventor
G.E. Ford
By
Holcomb, Wetherill + Brisebois
Attorneys

G. E. FORD 3,147,672

APPARATUS FOR MAKING BOTTLE CAPS AND THE LIKE

Filed Sept. 27, 1961

Inventor
G. E. Ford
By
Holcombe, Wetherill & Brisebois
Attorneys

Fig.9

Sept. 8, 1964  G. E. FORD  3,147,672
APPARATUS FOR MAKING BOTTLE CAPS AND THE LIKE
Filed Sept. 27, 1961  9 Sheets-Sheet 8

Inventor
G.E. Ford
By
Holcomb, Wetherill & Brisebois
Attorneys

United States Patent Office 3,147,672
Patented Sept. 8, 1964

3,147,672
APPARATUS FOR MAKING BOTTLE CAPS
AND THE LIKE
Geoffrey E. Ford, Bedford, England, assignor to Fords (Finsbury) Limited, Bedford, England, a British company
Filed Sept. 27, 1961, Ser. No. 141,181
Claims priority, application Great Britain Sept. 30, 1960
6 Claims. (Cl. 93—1.3)

The present invention relates to apparatus for forming crimped or pleated metal foil caps for bottles or the like said caps being of the kind described in my co-pending application Serial No. 654,156, now Patent No. 3,000,526, and my prior Patent No. 2,981,161. According to those specifications the caps have a long skirt which is formed in two portions, viz. a slightly tapering upper portion closed at one end and a flange projecting radially outwards from the other, open, end thereof.

It is an object of the present invention to provide apparatus for producing such caps at high speed.

From one aspect the invention provides apparatus for forming caps of the kind referred to above and including male and female press tools in which the male tool is mounted on a plate carried by the apparatus and including a plunger surrounded by an ejector ring and a spring-loaded male pressure member, and in which the female tool comprises a female pressure member adapted to co-act with the male pressure member and within which is located a recessed die ring, the tools being so arranged that to form a cap the female tool is moved towards the male tool so that said recessed die ring moves over the male plunger and depresses the spring-loaded male pressure member to form a cap having a shape referred to above and after the cap is formed and the tools begin to separate the said ejector ring ejects the formed cap into the recessed die of the female press tool where it is held until substantially complete separation of the tools whereupon the cap is ejected by means of a plunger passing through the recessed die of the female press tool. Preferably the plate carrying the male press tools is quickly releasable from the machine in the manner described in British Patent No. 667,301.

The female press tool is arranged to be moved by a simple connecting rod mechanism in timed relation with the intermittent feed of foil between the tools from a supply spool of metal foil.

According to another feature of the invention, a supply spool for a machine for making bottle caps and the like from metal foil is mounted on a jockey arm having a plurality of rollers thereon around which the foil is fed and threaded over an intermediate roller attached to the machine, said jockey arm being moveable upon the formation of a slack loop in the foil to apply a brake on to a hub of the said spool.

According to another feature of the invention a machine for manufacturing bottle caps or the like from metal foil is provided with a double feed spool arrangement mounted on a central pillar which is rotatable with respect to the machine but lockable in an operative position so that the two spools are swingable selectively into an operative position whereby whilst foil is being used from one supply spool the second supply spool can be loaded with foil so that upon exhaustion of the first spool the second spool may quickly be brought into position for use.

According to another feature of the invention in a machine for feeding foil between press tools there is provided a foil braking system between a supply spool and the tools and comprising a pair of pressure members adapted to apply pressure to the foil from opposite sides thereof and which are relatively slidably moveable upon the formation of a slack loop in the foil fed so as bodily to displace the strip of foil substantially to remove the loop.

According to another feature of the invention in a machine for blanking caps or the like from a strip of foil the waste strip from which blanks have been removed is taken up on a waste spooling arrangement that includes a hub and a jockey arm, the said jockey arm being moveable on overwinding of the hub to reduce driving power to the hub.

According to a further feature of the invention, in a machine for blanking bottle caps and the like from a strip of foil by means of press tools, means are provided operative upon stopping of the machine to allow the press tools to finish formation of a cap or the like and to open and eject the formed cap whereby the machine is not left in the condition in which a partly formed cap remains between the tools.

In order that the invention may be more clearly understood, reference will now be made to the accompanying drawings, which show one specific embodiment thereof by way of example only, and in which.

Figure 1:
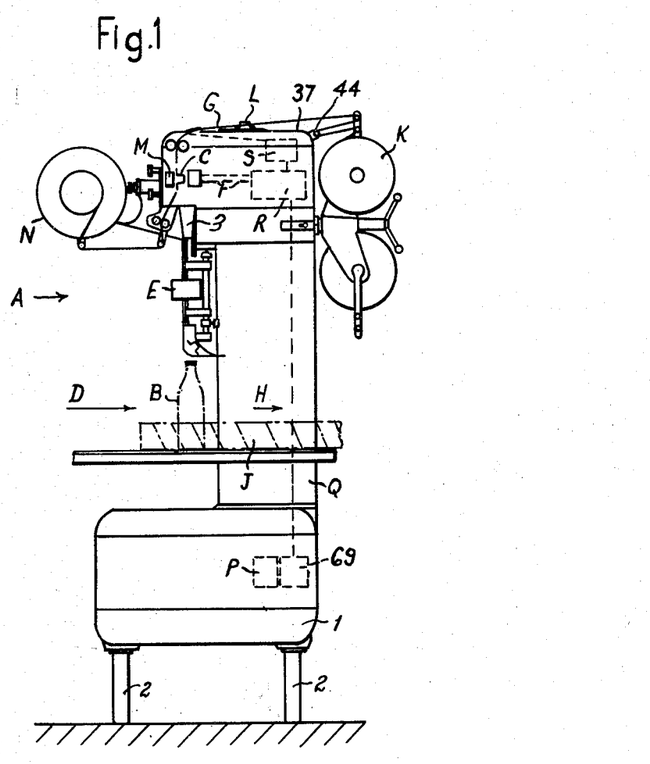
FIG. 1 shows a side view of a complete machine.

Referring now to the drawings, FIG. 1 shows the assembly of the complete machine, although somewhat schematically. The machine employs many conventional mechanisms and arrangements which are well known and conventional in the art to which the invention relates and therefore need not be fully described. Such conventional mechanisms and arrangements are hereinafter acknowledged as such and are denoted by their outside casings only so that their position in the whole machine can be shown without unnecessarily complicating the drawings by detailing equipment which per se, forms no part of the actual invention.

This figure also shows the location of the various units subsequently to be described, in block or diagrammatic form.

The machine, denoted generally at A, is built on a cast iron base 1 which is mounted on four adjustable legs 2 so that it may be adapted for any height of bottle conveyor track usual in the art within certain predetermined limits, for example from 31" to 45". Such track comes from a bottle store and feeds the bottles, one of which may is shown at B under a chute 3 down which the caps C made by the machine A are fed or supplied. The said track has not been illustrated but feeds bottles from the left as indicated by the arrow D. The base contains a high-powered motor (not shown), e.g. of 2 H.P. and a variable speed drive unit which gives a 3:1 speed variation. A reciprocating air pump (not shown)

is belt driven from the motor and supplies high pressure air to eject the caps from the press tools denoted schematically at M and F in FIG. 1. Such air pumps are conventional.

Figure 8:
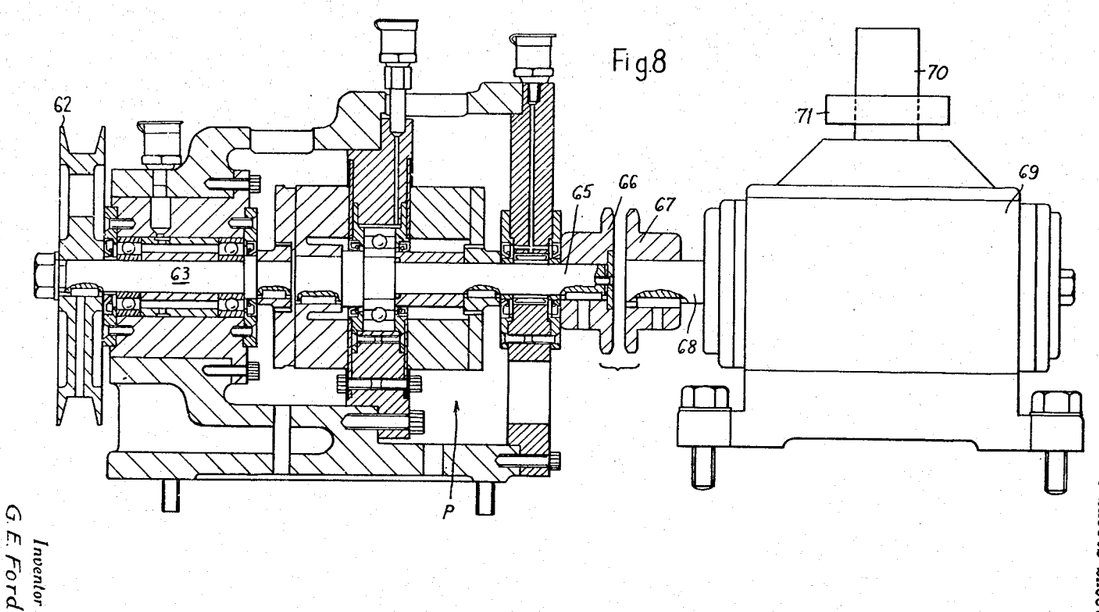
FIG. 8 shows an axial vertical section through a clutch unit assembly adapted for stopping the machine with the tools in the open position and the cap ejected.

An electromagnetic clutch and brake assembly P transmits power from the variable speed drive to a worm speed reduction box having a ratio of 5:1. The clutch and brake assembly is conventional and has operating coils wired in such a way that the brake is applied when the drive is released by the clutch and vice versa and the assembly is illustrated in FIG. 8. This forms part of a control equipment operated by a photoelectric cell device schematically denoted by E in the chute 3 taking the cap output from the machine. The photoelectric cell control arrangement may be similar to that described in my prior Patent No. 2,811,126. The metal foil passing through the machine is shown at G.

In order to simplify adjustment and speed control, a conventional tachometer is driven from the output shaft of the worm box. In practice it is necessary to adjust the speed of the machine as closely as possible to the speed at which the bottles are fed in a line beneath the output chute 3 from the machine and to the capping station in order to reduce the amount of work which is done by the control mechanism, to a minimum. The capping station is not illustrated, but would be located to the right of the machine A in FIG. 1, the bottles with their hat-shaped caps resting thereover being fed to the capping machine in the direction of the arrow H by a suitable conveyor shown schematically at J.

Figure 2:
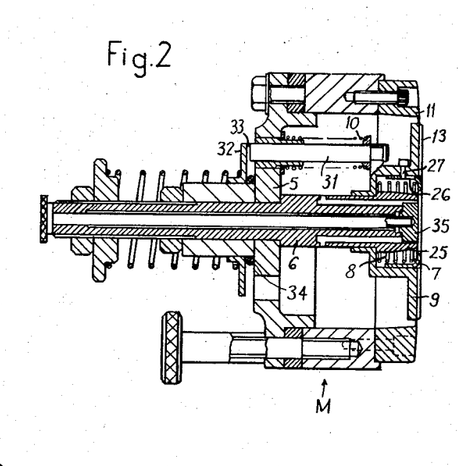
FIG. 2 shows an axial section through the male forming tool.
Figure 3:
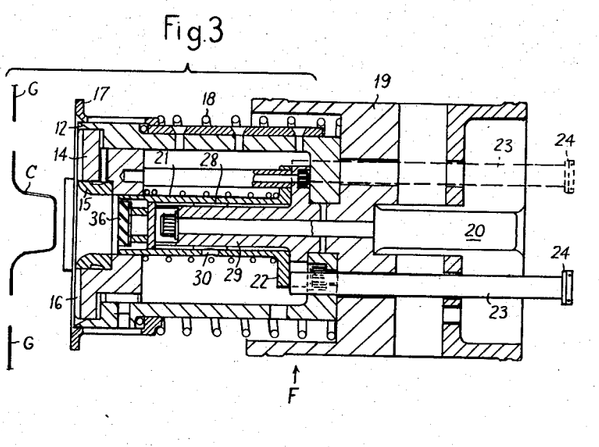
FIG. 3 shows an axial section through the female forming tool.

The press tools are shown in FIGS. 2 and 3 and are divided into male and female assemblies M and F respectively. The male tool assembly, shown in FIG. 2, is mounted on a plate 5 carried by the machine and including a plunger 6 surrounded by an ejector ring 7 which is spring-loaded at 8 on to a male pressure member 9 which itself is spring-loaded at 10 with respect to the mounting plate 5 and the assembly of plunger 6, ejector ring 7 and male pressure member 9 are removable as a unit on the mounting plate in the manner described in my prior U.S. Patent No. 2,981,161 so as to leave the maximum space for removal of any jammed caps that may possibly be present. This assembly when mounted is located within a cutting die or shear ring 11 which coperates with a cooperating member in the form of a cutting punch 12 on the female tool set F (FIG. 3) thus to form a pair of shearing tools for cutting or blanking discs from the strip of foil G fed between the tools.

The female tool set F shown in FIG. 3 comprises an annular female pressure member 14 adapted to coact with the male pressure member 9 and within which is located a die ring 15 which is recessed inwardly as shown. The female pressure member and die ring are similar to those described in my prior Patent No. 2,981,-161.

The annular female pressure member is radially fluted at 16 so that the flutes 13 and 16 become mutually imbricated when the male and female tools meet, and is mounted within the cutting punch 12 which cooperates with the shear ring or cutting die 11 of the male tool set as referred to above, and around the cutting punch 12 is a stripper ring 17 which is spring-loaded at 18 with reference to a cross-headpiece 19 that is connected at 20 to a crank (not shown in FIG. 3) driven from the main motor drive referred to later. Centrally of the female tool set is an ejector rod 21 whose rear end has an annular shoulder 22 abutted by a plurality of rods two of which are indicated at 23 mounted on leaf springs 24 of very light pressure in the main casing of the machine. The anchoring points for springs 24 has not been shown in FIG. 3.

In operation of the press tools the female tool set F is moved towards the male tool set M and on meeting, firstly a disc of foil is cut by the shearing tools 11, 12 from the strip of foil which is intermittently driven by any conventional drive means between the tools, whereupon the male and female pressure members 9 and 14 meet to grip the blank. As referred to above, the male and female pressure members 9 and 14 are ribbed or fluted radially of their annular surfaces at 13 and 16 respectively so as to crimp an outer flange portion of the disc which is to form the "brim" of the hat-shaped cap. The central part of the female tool including the pressure member is then subjected to further pressure causing said pressure member 14 to push back the male pressure member, whereby the central part of the disc of foil is pushed over the front end 25 of the male forming plunger 6 thereby pressing the ejector ring 7 back to a closed condition and forming a cap having an upper slightly conical part closed at one end and a radially extending flange from the lower open end thereof. The ejector ring 7 is slotted at 26 and a screw 27 passes through the pressure member 9 to act as a guide and limit stop for the ejector ring 7 as will be apparent.

When the tools commence to open, the ejector ring 7 moves forward under pressure from spring 8 to eject the formed cap into the recessed female die at 15 so that the cap is held therewithin and in order to keep the cap in position in the die, means are provided for reducing the atmospheric pressure thereon. This comprises a piston 28 within the female tool operating behind the closed end of the cap located within the recess 15, said piston 28 increasing the clearance between its end and the closed cap so as to increase the volume of the space therebetween and since this is a sealed space the pressure therein is reduced but on further backward movement of the female tool the ejector-operating spindle 29 causes the piston 28 to uncover a port 30 in the cylinder or sleeve therearound which forms the ejector rod 21, so as to admit air to the said space and at the same time the annular shoulder 22 abuts the push rods 23 so that the ejector rod 21 is pushed forward to eject the cap against the light pressure from the leaf spring 24. The cap is, however, not ejected until the tools are fully opened.

In order to enable the machine to work at high speeds the male pressure member works against spring-loaded rods 31 between whose ends and a flange 32 surrounding a portion secured rearwardly of the mounting plate 5 there is a small clearance 33. Radially inwards from this clearance there is a small O ring 34 and these two means act as a shock absorber and take up the initial shock of impact when the female tool strikes the male tool.

The end 25 of the male plunger 6 may be provided with an embossing pad 35 containing advertising indicia etc. and the end of the ejector rod 21 in the female tool set carries a rubber pad 36 for pressing the closed end of the cap against the embossing pad 35.

FIG. 3 shows the shape of the cap C formed by the tools from the foil strip G passed therebetween. Other conventional mechanical parts of the tools will be apparent from the showing of FIGS. 2 and 3.

Figure 4:
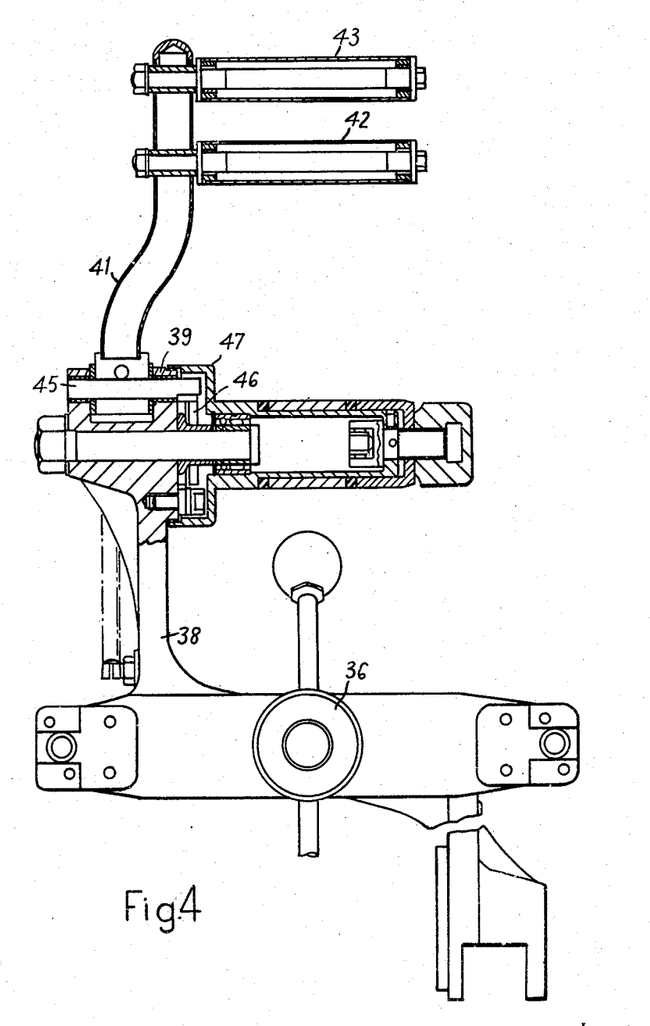
FIG. 4 shows a side view of the supply or feed spooling arrangements, partly in section
Figures 5, 6:
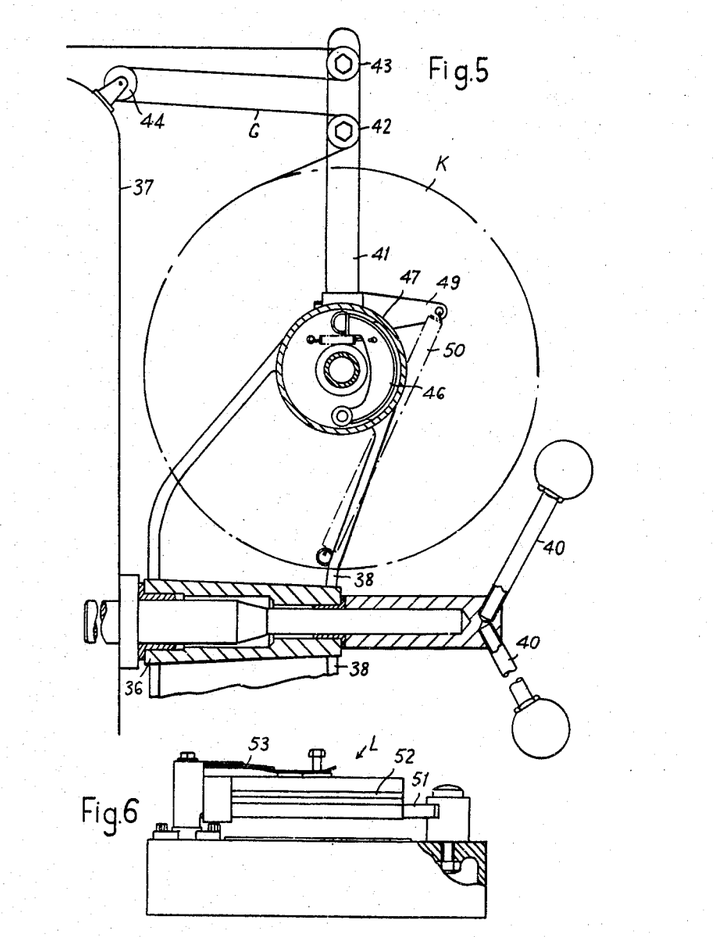
FIG. 5 shows a frontal view thereof also partly in section.
FIG. 6 shows a side view, partly in section, of a foil braking arrangement.

The feed spool arrangement denoted generally at K is shown in FIGS. 4 and 5 and comprises a central pillar 36 rotatably mounted with respect to the machine housing shown in part outline only at 37 and from which radially extend two diametrically opposed mounting arms 38 upon each of which a spool or reel hub 39 is provided. The arrangement is such that while one spool of foil is passing through the machine from one of the hubs, a second spool can be mounted on the second hub in readiness so that when the first spool is exhausted the pillar can be unlocked, rotated through substantially 180° by the handles 40 and the second spool brought very quickly into position for threading through the tools. Only one arm 38 and associated components is shown in FIGS. 4 and 5, so as to reduce unnecessary complications on the drawings, but the two arms are shown in the schematic arrangement of FIG. 1. Each hub 39 has pivotally mounted thereon a jockey arm 41 containing two rollers 42, 43 and the foil G is passed around the lower roller 42, over a roller 44 mounted on the machine and thence around the upper roller 43 on the jockey arm before being passed to a foil-feed arrangement. The jockey arm is arranged to pivot about its pivot shaft 45 to operate an internal expanding shoe brake 46 fitted to the hub or reel spindle 39 so that if the foil starts to overrun the brake shoe 46 is applied against the brake drum 47 to which the spindle 48 supporting the foil is secured. Since expanding brakes are well known per se, this action will be clearly understood without further elaboration. The end of the arm 41 is provided with a projecting finger 49 and a spring 50 is anchored between finger 49 and the mounting arm 38. Thus, movement of the jockey arm 41 is against spring tension whereby the spring 50 acts as a restoring spring for the arm 41. The double loop arrangement ensures that the jockey arm 41 moves at only about half the velocity of a conventional jockey arm braking system as previously applied to such machines and therefore has only about a quarter the stored energy of other arrangements. Therefore, if the jockey arm 41 moves back too fast the brake 46 is applied.

In order to reduce the amount of work which feed rollers for feeding the foil to the tool have to do, there is provided a friction braking or gripping device L shown in FIG. 6 which does most of the work in pulling the foil from the supply spool. FIG. 6 shows a view looking from the left of FIG. 1. This foil brake is mounted to slide on a horizontal support 51 on the top of the machine and is reciprocated by means of a rack and pinion that meshes with a pinion driven by a feed gear wheel for feeding the foil (see FIGS. 10 and 11). The rack is secured to the slide. The foil is passed from the upper roller 43 of the jockey arm 41 of the feed spool, between two replaceable felt pads 52 which are pressed together by means of a leaf spring 53 or any other suitable arrangement.

Figure 7:
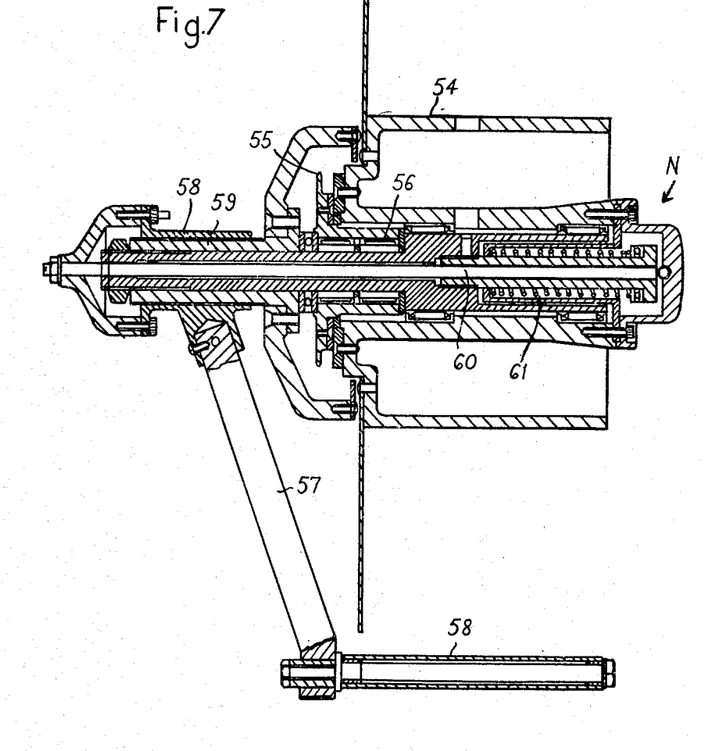
FIG. 7 shows an axial section through the waste spooling arrangement.

After passing through the tool assemblies M and F (FIGS. 2 and 3), the drive of which will be referred to later, the waste foil is rewound on a drum arrangement N shown in greater detail in FIG. 7 which represents a view looking from the left of FIG. 1. The drum 54 is driven continuously by means of a cog 55 connected by a chain (not shown) to a cog on the main drive and through a friction arrangement. The drive transmitted by a clutch 56 may, however, be reduced or completely disconnected depending on the position of a jockey arm 57 engaging with the loop of waste foil coming from between the press tools and the rewind drum 54. The jockey arm 57 has a spindle around which the foil from the tools is wound before passing to the drum 54. Thus, if the rewind drum 54 tends to overwind, the jockey arm 57 is moved in such a direction that the drive power is reduced. This is effected by mounting a cap 58 on the end of the jockey arm on a screwed sleeve 59 which operates to move a pressure rod 60 against the action of a spring 61 to control the pressure of the friction clutch 56 and thus control the drive of the rewind drum 54.

In accordance with a very important feature of the invention the machine can always be stopped with the press tools wide open. This eliminates the chance of a cap being jammed in the press tools when the machine restarts and also makes it easier to thread the foil through the machine. Referring to FIG. 8, the main motor (not shown) transmits its drive via pulley 62 to a shaft 63 upon which is mounted a conventional electromagnetic clutch assembly generally indicated at P. The operation of this assembly will be apparent to a person skilled in the art and is therefore not more fully described here. It comprises conventional supporting members, casings and lubricating means e.g. as illustrated and the output shaft 65 of the clutch assembly terminates in a magnetic clutch face 66 located opposite a further magnetic clutch face 67 mounted on a shaft 68 of a reduction worm box 69 of conventional manufacture. When the two faces 66 and 67 are attracted together on completion of the clutch circuit the shaft 68 will be driven, as will be apparent. The vertically-arranged output shaft 70 of the worm box 69 will then revolve at a speed which is one fifth the speed of the shaft 63, as referred to above. In order to ensure that the machine always stops with the press tools open a cam operated switch schematically illustrated at 71 is mounted on the output shaft 70. This switch 71 is arranged to operate the clutch and brake circuit but only at one point on the machine operating cycle. This operates in such a way that the brake can only be energised and the clutch released as the tool are moving into the open position towards the end of their stroke.

The drive power for the machine is taken from the output shaft 70 of the worm box 69 through a universal joint and through a torque limiting device which may be of the kind described in my prior Patent No. 2,846,836, and this may be set to release at a torque of 1200 lbs./inch. After this torque limiter the drive is taken through a second universal joint immediately beneath the press tool unit illustrated in FIGS. 2 and 3. Since such drive arrangements will be apparent to those skilled in the art, it is unnecessary to show them here, but it may be noted that this transmission shaft with overload protection is housed inside a column Q (FIG. 1) which supports the press from the base 1 (FIG. 1). A compartment in the rear of this column may be provided and used for housing the switch gear and control equipment. This also will be readily apparent and has therefore not been illustrated.

The bottom section of the press unit consists of an oil sump 72 (FIG. 9) complete with a cam operated oil pump of conventional form (not shown) which supplies a continuous flow of lubricant to the appropriate parts of the press. The sump also contains a pair of helical gears 73, 74 which take a drive from the vertical main shafts 75 to a horizontal cross shaft 76 used for driving the rewind drum 59 by a chain, as referred to above in connection with FIG. 7. This assembly is denoted generally at R.

Figure 9:
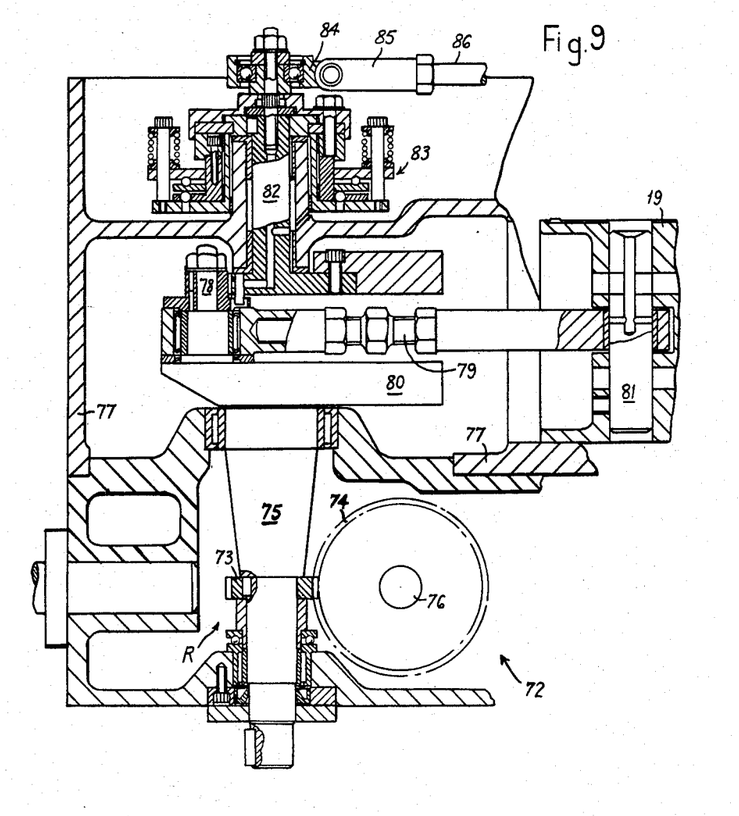
FIG. 9 shows a vertical section through the main shaft and torque limiter arrangements.

The main press frame 77 is bolted to the upper surface of the sump and contains a crank shaft 78 with balancing weights.

An adjustable connecting rod 79 is provided between the crank 80 and the cross head device 19 of the so-called piston, which forms the concentric press tool guide, as referred to above in connection with the description of the press tools in FIGS. 2 and 3. The adjustment of the connecting rod 79 enables the embossing pressure to be varied, and the rod 79 is connected to the cross-piece 19 by a gudgeon pin 81.

A shaft 82 and a second balance weight engaging with the crank 80 transmits the drive through a further torque limiting device illustrated at 83 to the foil feeding mechanism denoted generally by S. Any conventional means is provided for adjusting the timing of the foil feed in relation to the stroke of the press tools and also the length of foil fed to suit the size of cap being manufactured, as is usual in the art.

Figure 10:
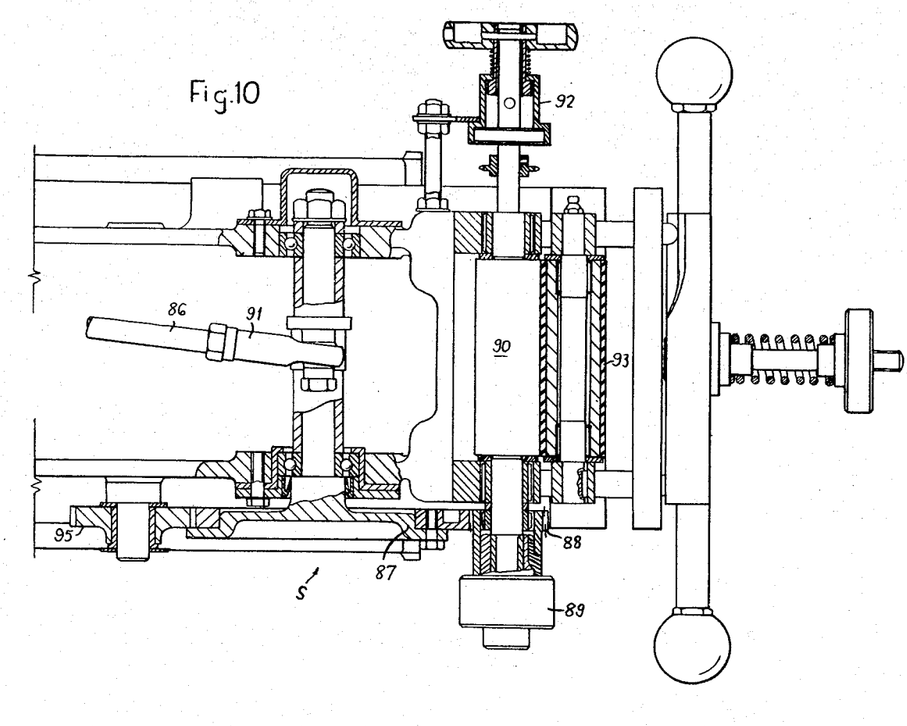
FIG. 10 shows a plan view of the foil feed assembly, partly in section.
Figure 11:
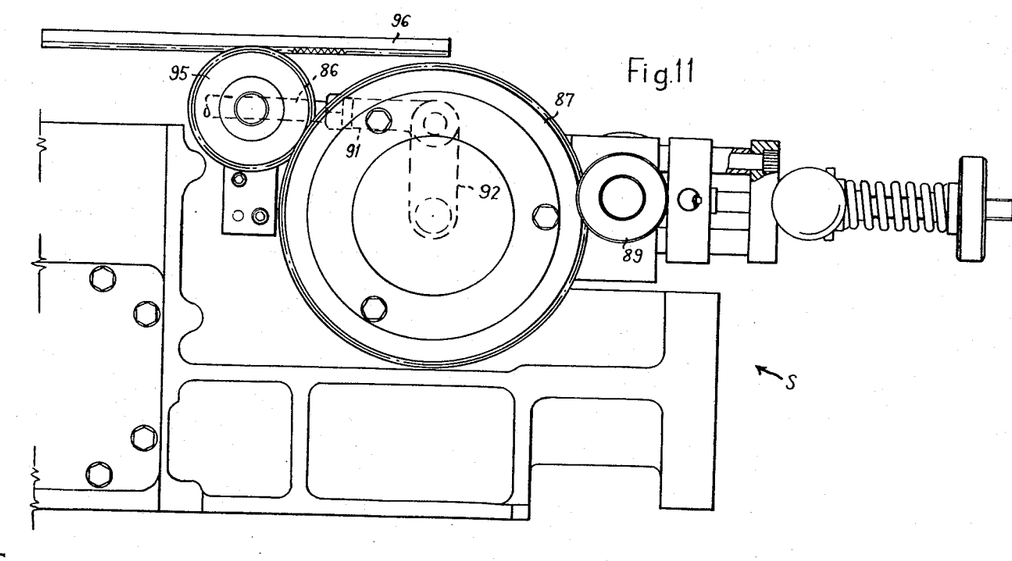
FIG. 11 shows a side view thereof also partly in section.

An adjustable crank mounted above the foil feed torque limiting device 83 referred to above comprises a connecting rod 84 and radius arm 85 which impart oscillatory motion to a shaft 86 and feed gear. The feed gear is shown in FIGS. 10 and 11 and comprises a gear wheel 87 and a pinion 88 on a sprag clutch 89 rotating on the main feed roller shaft 90. The shaft 86 is connected to gear wheel 87 by links 91 and 92 whereby the reciprocating motion of shaft 86 driven from crank 84 causes the gear wheel to be intermittently rotated through the sprag clutch 89 so that the feed roller 90 also rotates intermittently. A second sprag clutch 92 is fitted to the opposite end of the feed roller shaft 90 so that there is no possibility of backward rotation. This feed roller 90 is provided with an embossed pattern. A second feed roller 93 which is covered with rubber is pressed up against the feed roller by means of a spring. Plain foil fed between these rollers may be given a decorative finish e.g. by silk screening to improve the appearance of the cap.

A second pair of rollers (not shown) which are chain driven from the first pair 90, 93 via pinion 94 are provided in order to keep the foil tight as it passes between press tools. These two pairs of feed rollers take the foil from between the felt pads 52 (FIG. 6) of the brake or gripping arrangement. The gear wheel 87 meshes with a further pinion 95 which reciprocates a rack 96 for driving the slide 51 of the said brake or gripping arrangement of FIG. 6.

Immediately beneath the press tools there is provided a removable cap collector which guides the finished caps into the vertical telescopic delivery chute 3 having at its lower end a capsule applier, for example as referred to in my co-pending application No. 654,156. The height of this applier above the bottle conveyor track is adjustable in any suitable fashion.

The chute 3 is provided with a photoelectric cell level control E as referred to above so that if the rate of production of caps by the press tools exceeds the rate at which caps are removed by the oncoming bottles, the level in the chute will increase until the light shining on the photo electric cell is interrupted by the caps. When this happens the electric brake and clutch will be operated and the press will stop with the press tools open and the last cap ejected. The machine will remain stationary until the level in the chute falls once more.

The machine may be placed anywhere along the conveyor track for the bottles provided that the diameter of the base of the bottle being encapsulated is greater than the diameter of the flange on the formed cap as supplied by the machine as shown in FIG. 1. If this is not the case the machine is mounted as closely as possible to the sealing machine and the screw infeed of the sealing machine is extended so that the bottles enter this screw just prior to the cap being applied to the bottle and remain in it spaced out until they are received by the receiving arrangement of the sealing machine.

It will be appreciated that the drawings contain details which are not specifically referred to herein: such members as are not referred to do not per se form part of the invention and their arrangement and operation will be apparent to those skilled in the art. They have therefore not been fully described, so as not to confuse the showing of the invention. They do, however, point out the location and operation of the arrangements forming part of the invention and for this reason have been included.

It should also be understood that FIG. 8 shows a view of the clutch unit looking from the left of FIG. 1 and that FIGS. 9, 10 and 11 represent views taken from the rear of FIG. 1 and not from the front as are FIGS. 2 and 3.

I claim:

1. Apparatus for forming caps from metal foil, including a female press tool mounted to move with respect to said apparatus, a female pressure member in said female press tool, a recessed die ring located within said pressure member, a hollow ejector rod mounted on said female press tool to slide into said recessed die ring from the rear, a piston mounted to slide within said ejector rod to generate suction acting on a formed cap lying in said recessed die ring to retain said cap temporarily in said die ring, and means for axially moving said ejector rod for ejection of said cap from said female press tool.

2. Apparatus for forming caps from metal foil, including a female press tool mounted to move with respect to said apparatus, a female pressure member in said female press tool, a recessed die ring located within said pressure member, a hollow ejector rod mounted on said female press tool to slide into said recessed die ring from the rear, and a piston mounted to slide within said ejector rod to generate suction acting on a formed cap lying in said recessed die ring to retain said cap temporarily in said die ring, means for axially moving said ejector rod, said ejector rod being ported to allow air to be drawn into said ejector rod on movement of said piston therepast for ejection of said cap from said female press tool.

3. Apparatus for forming caps from metal foil, including a female press tool mounted to move with respect to said apparatus, a female pressure member in said female press tool, a recessed die ring located within said pressure member, a hollow ejector rod mounted on said female press tool to slide into said recessed die ring from the rear, a piston mounted to slide within said ejector rod to generate suction acting on a formed cap lying in said recessed die ring to retain said cap temporarily in said die ring, said ejector rod being ported to allow air to be drawn into said ejector rod on movement of said piston therepast for ejection of said cap from said female press tool, and push rods resiliently mounted by their one ends on said female press tool, the other ends of said push rods being in contact with a part of said hollow ejector rod for axial movement of said ejector rod.

4. Apparatus for forming caps from metal foil, by means of male and female press tools, comprising a plate carried by said apparatus, means for mounting a male tool on said plate, said male tool including a plunger, an ejector ring surrounding said plunger, and a spring-loaded male pressure member around said pressure ring, a female press tool mounted to move with respect to said apparatus, a female pressure member in said female press tool and arranged to co-act with said male pressure member, a recessed die ring located within said pressure member, means for moving said female tool towards said male tool in such position that said recessed die ring moves over said male plunger to depress said spring-loaded male pressure member to form a cap having a slightly tapering upper portion closed at one end and a flange projecting radially outwards from the open end, means for separating said male and said female tools after formation of said cap, means operating on separation of said tools to move said ejector ring to eject the formed cap into said recessed die of said female press tool, a hollow ejector rod mounted on said female press tool to slide into said recessed die ring from the rear, and a piston mounted to slide within said ejector rod to generate suction acting on said cap lying in said recessed die ring to retain said cap temporarily in said die ring, means for axially moving said ejector rod, said ejector rod being ported to allow air to be drawn into said ejector rod on movement of said piston therepast for ejection of said cap on substantially complete separation of said male and female press tools.

5. Apparatus for forming caps from metal foil, by means of male and female press tools, comprising a plate carried by said apparatus, means for mounting a male tool on said plate, said male tool including a plunger, an ejector ring surrounding said plunger, and a spring-loaded male pressure member around said pressure ring, a female press tool mounted to move with respect to said apparatus, a female pressure member in said female press tool and arranged to co-act with said male pressure member, a recessed die ring located within said pressure member, means for moving said female tool towards said male tool in such position that said recessed die ring moves over said male plunger to depress said spring-loaded male pressure member to form a cap having a slightly tapering upper portion closed at one end and a flange projecting radially outwards from the open end, means for separating said male and said female tools after formation of said cap, means operating on separation of said tools to move said ejector ring to eject the formed cap into said recessed die of said female press tool, a hollow ejector rod mounted on said female press tool to slide into said recessed die ring from the rear, a piston mounted to slide within said ejector rod to generate suction acting on a formed cap lying in said recessed die ring to retain said cap temporarily in said die ring, and push rods resiliently mounted by their one ends on said female press tool, the other ends of said push rods being in contact with a part of said hollow ejector rod for axial movement of said ejector rod.

6. Apparatus for forming caps from metal foil, by means of male and female press tools, comprising a plate carried by said apparatus, means for mounting a male tool on said plate, said male tool including a plunger, an ejector ring surrounding said plunger, and a spring-loaded male pressure member around said pressure ring, a female press tool mounted to move with respect to said apparatus, a female pressure member in said female press tool and arranged to co-act with said male pressure member, a recessed die ring located within said pressure member, means for moving said female tool towards said male tool in such position that said recessed die ring moves over said male plunger to depress said spring-loaded male pressure member to form a cap having a slightly tapering upper portion closed at one end and a flange projecting radially outwards from the open end, means for separating said male and said female tools after formation of said cap, means operating on separation of said tools to move said ejector ring to eject the formed cap into said recessed die of said female press tool, a hollow ejector rod mounted on said female press tool to slide into said recessed die ring from the rear, a piston mounted to slide within said ejector rod to generate suction acting on said cap lying in said recessed die ring to retain said cap temporarily in said die ring, said ejector rod being ported to allow air to be drawn into said ejector rod on movement of said piston therepast for ejection of said cap on complete separation of said male and female press tools, and push rods resiliently mounted by their one ends on said female press tool, the other ends of said push rods being in contact with a part of said hollow ejector rod for axial movement of said ejector rod.

References Cited in the file of this patent

UNITED STATES PATENTS

| | | |
|---|---|---|
| 1,786,917 | Ochmichen | Dec. 30, 1930 |
| 1,811,460 | Eaton | June 23, 1931 |
| 2,023,502 | Armstrong | Dec. 10, 1935 |
| 2,596,050 | Sonnenberg | May 6, 1952 |
| 2,599,820 | Ford | June 10, 1952 |
| 2,635,824 | Schneider | Apr. 21, 1953 |
| 2,677,318 | Torudd et al. | May 4, 1954 |
| 2,684,615 | Taylor | July 27, 1954 |
| 2,700,513 | Miles | Jan. 25, 1955 |
| 2,830,507 | Hickin et al. | Apr. 15, 1958 |
| 2,966,099 | Ford et al. | Dec. 27, 1960 |
| 2,970,527 | Fisher | Feb. 7, 1961 |

FOREIGN PATENTS

| | | |
|---|---|---|
| 717,507 | Great Britain | Oct. 27, 1954 |
| 578,997 | Canada | July 7, 1959 |